United States Patent
Satou

(10) Patent No.: US 12,472,929 B2
(45) Date of Patent: Nov. 18, 2025

(54) ELECTRIC POWER GENERATION LOAD REDUCTION METHOD AND ELECTRIC POWER GENERATION LOAD REDUCTION APPARATUS FOR INTERNAL COMBUSTION ENGINE FOR VEHICLE

(71) Applicant: NISSAN MOTOR CO., LTD., Yokohama (JP)

(72) Inventor: Katsunori Satou, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 194 days.

(21) Appl. No.: 18/274,681

(22) PCT Filed: Jan. 28, 2021

(86) PCT No.: PCT/JP2021/002930
§ 371 (c)(1),
(2) Date: Jul. 27, 2023

(87) PCT Pub. No.: WO2022/162809
PCT Pub. Date: Aug. 4, 2022

(65) Prior Publication Data
US 2024/0246528 A1    Jul. 25, 2024

(51) Int. Cl.
B60W 20/15     (2016.01)
(52) U.S. Cl.
CPC ..... B60W 20/15 (2016.01); *B60W 2510/0638* (2013.01); *B60W 2510/0657* (2013.01)
(58) Field of Classification Search
CPC ......... B60W 20/15; B60W 2510/0638; B60W 2510/0657; B60K 28/10; F02D 29/06; F16H 61/12; H02P 9/04
(Continued)

(56) References Cited

U.S. PATENT DOCUMENTS

| 9,073,427 B2 * | 7/2015 | Ueda | B60W 10/06 |
| 2003/0033068 A1 * | 2/2003 | Kawai | B60K 6/12 |
| | | | 701/67 |

(Continued)

FOREIGN PATENT DOCUMENTS

| JP | H06-115375 A | 4/1994 |
| JP | 2017-180702 A | 10/2017 |

(Continued)

OTHER PUBLICATIONS

Bellin et al. (DE102016224930.translate); Volkswagen AG; Verfahren zur Steuerung und/oder Regelung eines Antriebsstranges,insbesondere eines Hybrid-Antriebsstranges eines Kraftfahrzeugs. (Year: 2018).*

(Continued)

*Primary Examiner* — B M M Hannan
(74) *Attorney, Agent, or Firm* — Foley & Lardner LLP

(57) ABSTRACT

An internal combustion engine is connected to a transmission via a torque converter. The transmission includes a continuously variable transmission mechanism and a clutch. When the transmission is switched from the P range to the D range, a rotation speed of the internal combustion engine decreases with engagement of the clutch. In order to suppress engine stalling in cold climates, electric power generation of an alternator is stopped to reduce an electric power generation load when a speed difference between the rotation speed of the engine and an input rotation speed of the transmission becomes greater than or equal to a predetermined speed difference value. The electric power generation is restarted after a predetermined time period has elapsed since the input rotation speed of the transmission became lower than or equal to a second predetermined rotation speed value.

10 Claims, 3 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 2011/0029174 | A1* | 2/2011 | Schenk | B60K 6/48 180/65.265 |
| 2011/0231048 | A1* | 9/2011 | Matsubara | B60W 30/14 903/902 |
| 2012/0323425 | A1* | 12/2012 | Suyama | B60W 30/192 701/22 |
| 2013/0030624 | A1* | 1/2013 | Suyama | B60W 10/02 180/65.265 |
| 2014/0094342 | A1* | 4/2014 | Kobayashi | B60L 50/16 903/902 |
| 2015/0046005 | A1* | 2/2015 | Kasuya | F16H 61/0031 180/65.265 |
| 2015/0353075 | A1* | 12/2015 | Futatsudera | B60W 20/00 180/65.23 |
| 2016/0223077 | A1 | 8/2016 | Takahashi et al. | |
| 2016/0355173 | A1* | 12/2016 | Tajima | B60W 10/04 |
| 2017/0284542 | A1* | 10/2017 | Takahashi | F02D 15/00 |
| 2018/0022355 | A1* | 1/2018 | Banshoya | F16H 61/0265 477/5 |
| 2019/0039602 | A1* | 2/2019 | Kusabe | B60W 10/06 |
| 2020/0101962 | A1* | 4/2020 | Vogt | B60W 10/02 |
| 2021/0188250 | A1* | 6/2021 | Inoue | B60K 6/445 |
| 2021/0188251 | A1* | 6/2021 | Inoue | B60W 10/08 |

FOREIGN PATENT DOCUMENTS

| | | |
|---|---|---|
| JP | 2018-042407 A | 3/2018 |
| WO | WO-2015/060204 A1 | 4/2015 |

OTHER PUBLICATIONS

Matsubara et a. (DE112009003597.translate); Toyota Motor Co Ltd; Power Transmitting Apparatus for Vehicle. (Year: 2021).*

* cited by examiner

ELECTRIC POWER GENERATION LOAD REDUCTION METHOD AND ELECTRIC POWER GENERATION LOAD REDUCTION APPARATUS FOR INTERNAL COMBUSTION ENGINE FOR VEHICLE

TECHNICAL FIELD

The present invention relates to an electric power generation load reducing method and electric power generation load reducing apparatus for an internal combustion engine for a vehicle, by which electric power generation of a generator is temporarily stopped to suppress stalling of the internal combustion engine when a transmission is switched from a non-driving shift position to a driving shift position.

BACKGROUND ART

Patent Document 1 discloses a technique of, to suppress stalling of an internal combustion engine when a transmission is switched from a non-driving shift position to a driving shift position for starting of a vehicle, controlling an alternator to stop its electric power generation operation for a predetermined time period after the switching of the shift position. In this technique, it is intended to reduce the load of the internal combustion engine by stopping the electric power generation.

In the case where the electric power generation is temporarily stopped as mentioned above, all the electric power required during stop of the electric power generation is supplied from a battery. It is thus desirable that the period of stop of the electric power generation is as short as possible under a condition that the SOC (State of Charge) of the battery is low e.g. immediately after cranking of the internal combustion engine. When the transmission is switched from the non-driving shift position to the driving shift position, however, a decrease of the rotation speed of the internal combustion engine due to the action from the transmission side actually occurs with a delay after the switching of the shift position. Hence, the electric power generation load cannot always be reduced at the optimum timing in the technique of Patent Document 1 whereby it is not possible to obtain an effective improvement of anti-stall characteristics by the minimum electric power generation stop.

PRIOR ART DOCUMENTS

Patent Documents

Patent Document 1: Japanese Unexamined Patent Application Publication No. H6-115375

SUMMARY OF THE INVENTION

One aspect of the present invention is characterized in that, in a vehicle configuration in which an internal combustion engine is connected to a transmission via a torque converter, a generator of the internal combustion engine is controlled to stop its electric power generation when a speed difference between a rotation speed of the internal combustion engine and an input rotation speed of the transmission becomes greater than or equal to a predetermined speed difference value after the transmission is switched from a non-driving shift position to a driving shift position.

In the non-driving shift position, the input and output sides of the torque converter try to rotate integrally by virtue of the viscosity of hydraulic oil so that the speed difference between the rotation speed of the internal combustion engine on the input side rotation speed of the torque converter and the input rotation speed of the transmission on the output side of the torque converter is small. After the switching from the non-driving shift position to the driving shift position, the rotation speed of the internal combustion engine on the input side of the torque converter decreases when the load is actually exerted on the output side of the torque converter by the resistance of the power transmission path including the transmission. Accordingly, the speed difference between the rotation speed of the internal combustion engine and the input rotation speed of the transmission increases. This increase of the speed difference between the engine rotation speed and the transmission input rotation speed accurately indicates a change of the load exerted on the internal combustion engine from the transmission side. Thus, the electric power generation load is reduced at an appropriate timing by stopping the electric power generation when the above-mentioned speed difference becomes greater than or equal to the predetermined speed difference value.

Another aspect of the present invention is characterized in that, in a vehicle configuration in which an internal combustion engine is connected to a transmission via a torque converter, a generator of the internal combustion engine is controlled to stop its electric power generation when an input rotation speed of the transmission becomes lower than or equal to a predetermined speed value after the transmission is switched from a non-driving shift position to a driving shift position.

After the switching from the non-driving shift position to the driving shift position, the input rotation speed of the transmission on the output side of the torque converter decreases when the power transmission path including the transmission actually approaches a power transmission state. This decrease of the transmission input rotation speed also indicates a change of the load exerted on the internal combustion engine from the transmission side. The electric power generation load is thus reduced at an appropriate timing by stopping the electric power generation when the transmission input rotation speed becomes lower than or equal to the predetermined speed value.

DESCRIPTION OF EMBODIMENTS

Hereinafter, one embodiment of the present invention will be described in detail below with reference to the drawings.

Figure 1:
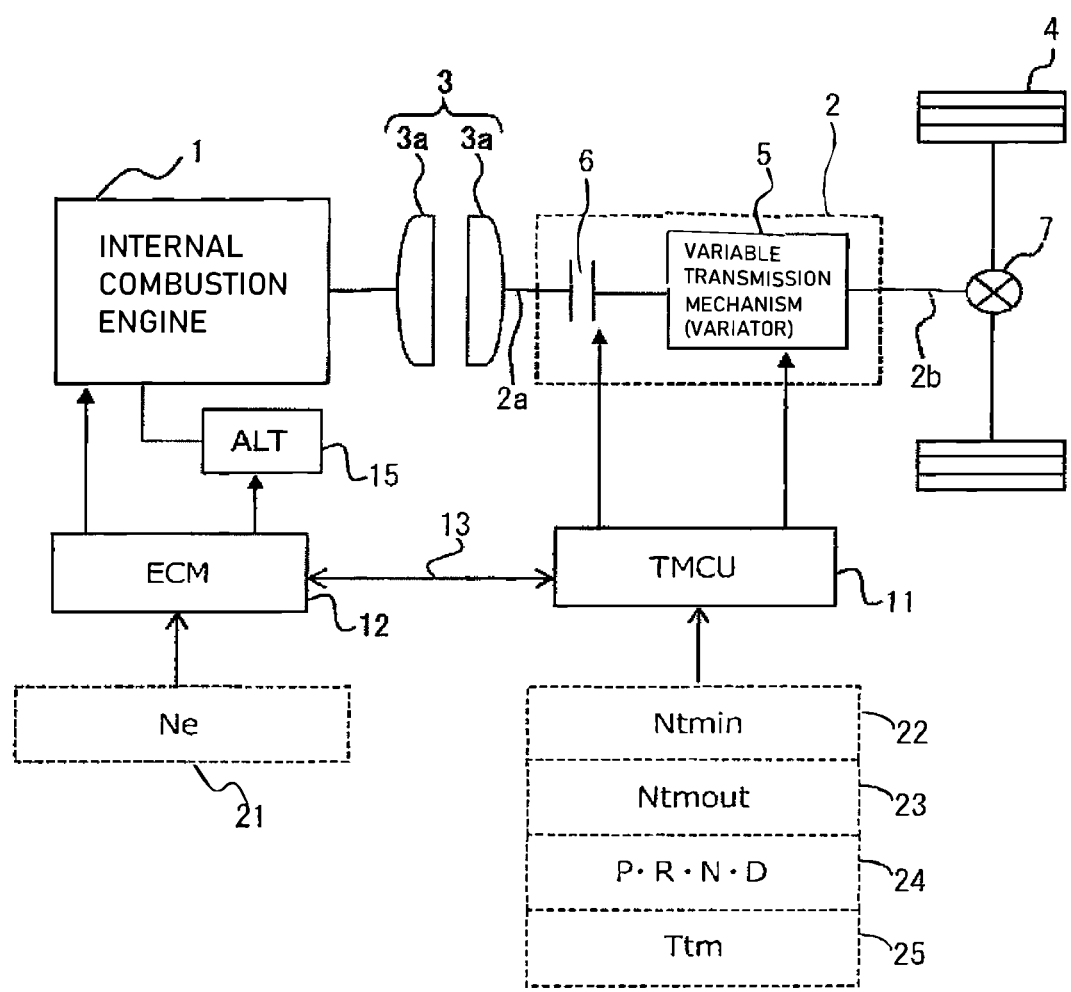
FIG. 1 is a schematic configuration diagram of a vehicle to which one embodiment the present invention is applied.

FIG. 1 is a schematic system configuration view of a vehicle to which one embodiment of the present invention is applied.

In the present embodiment, the vehicle includes an internal combustion engine 1 as a driving power source connected to a transmission 2 via a torque converter 3 so that driving wheels 4 of the vehicle are driven by the internal combustion engine through the transmission 2 and the torque converter 3. Although the internal combustion engine 1 can be either a gasoline engine or a diesel engine, the internal combustion engine 1 is in the form of a gasoline engine, i.e., a spark ignition internal combustion engine in the present embodiment.

The torque converter 3 has a pump impeller 3a as an input element and a turbine 3b as an output element so as to allow torque transmission therebetween by hydraulic oil. Although not specifically shown in the drawings, a lockup clutch may be provided between these torque converter elements.

In the present embodiment, the transmission 2 includes a belt-type continuously variable transmission mechanism (variator) 5 and a forward/reverse switching mechanism. The continuously variable transmission mechanism 5 has a driving-side primary pulley, a driven-side secondary pulley and a metallic belt wound around the primary and secondary pulleys such that the gear ratio of the transmission mechanism can be continuously varied by changing the widths of the pulleys. A transmission input shaft, which serves as a rotation axis of the primary pulley, is connected to the turbine 3b of the torque converter 3 via the forward/reverse switching mechanism. In the present embodiment, the forward/reverse switching mechanism is of the type using a planetary gear set including a clutch 6. Further, an input shaft of the clutch 6 corresponds to the transmission input shaft 2a in the present embodiment. A transmission output shaft 2b, which serves as a rotation axis of the secondary pulley, is provided to transmit power to the driving wheels 4 via a final gear unit 7 and a differential gear unit.

The gear ratio of the continuously variable transmission mechanism 5 is controlled by a transmission controller (TMCU) 11 mainly based on an accelerator opening and a vehicle running speed. Similarly, the forward/reverse switching mechanism including the clutch 6 is controlled by the transmission controller 11. The clutch 6 is disengaged to interrupt power transmission when a shift lever of the transmission 2 is in a non-driving shift position such as P (parking) range or N (neutral) range. When the shift lever of the transmission 2 is in a driving shift position such as D (drive) range or R (reverse) range, the clutch 6 is engaged to allow power transmission. Herein, the clutch 6 is actually a hydraulically engageable member provided as a forward clutch which is brought into engagement during forward running, a reverse brake which is brought into engagement during reverse running, or the like in the forward/reverse switching mechanism. The hydraulically engageable member, which is switched between an engaged state and a disengaged state according to the shift position, is representatively exemplified as the clutch 6 in FIG. 1.

The transmission 2 may alternatively be a stepped automatic transmission. In this case, any of hydraulically engageable members establishing the respective gear stages of the transmission corresponds to the clutch 6.

The fuel injection and ignition of the internal combustion engine 1 are controlled by an engine controller (ECM) 12.

The engine controller 12 and the transmission controller 11 are connected to each other via an in-vehicle network such as CAN communication network so as to transfer any required signals therebetween.

Various sensors and switches are connected to these controllers 11 and 12. The sensors required for the aftermentioned control of the present embodiment include at least: an engine rotation speed sensor 21 for detecting a rotation speed Ne of the internal combustion engine 1; a transmission input rotation speed sensor 22 for detecting a rotation speed of the transmission input shaft 2a as a transmission input rotation speed Ntmin; a transmission output rotation speed sensor 23 for detecting a rotation speed of the transmission output shaft 2b as a transmission output rotation speed Ntmout; a shift position sensor 24 for detecting the position (P range, R range, N range or D range) of the shift lever of the transmission 2 operated by a driver; and a transmission oil temperature sensor 25 for detecting a lubricating oil temperature Ttm of the transmission 2. Although the controllers 11 and 12 also receive detection signals from a plurality of sensors other than those mentioned above for various control operations of the internal combustion engine 1 and the transmission 2, those sensors are herein omitted from illustration.

The internal combustion engine 1 has a generator such as alternator 15 to generate electric power required for the internal combustion engine 1 itself and for the other electrical components in the vehicle. The alternator 15 is normally rotated and driven by the output of the internal combustion engine 1 via a belt mechanism. The electric power generated by the alternator 15 is stored in a battery. In the present embodiment, a so-called 12V battery is used; and the alternator 15 of the corresponding rating is provided in the internal combustion engine 1. Alternatively, the battery and the alternator may be of any other rating such as 48V.

The alternator 15 is equipped with a charge controller (regulator) to control a current flow according to the SOC of the battery and thereby avoid overcharging of the battery. Herein, the charge controller has the function of temporarily stopping electric power generation of the alternator according to a control signal from the engine controller 12 in order to achieve a reduction of electric power generation load. For example, the electric power generation is stopped by interrupting the flow of electric current to a rotor coil of the alternator in the case where the voltage of the battery is higher than or equal to a given lower allowable limit value. With the stop of the electric power generation, the load required for the internal combustion engine 1 to drive the alternator 15, that is, electric power generation load is reduced. In this stop method, the electric power generation is carried out in relation to battery deterioration or power consumption rate, even if there is a command to stop the electric power generation, in the case where the voltage of the battery is lower than the given lower allowable limit value. In the present invention, there can be used any specific method to stop the electric power generation.

In the present embodiment, the electric power generation is temporarily stopped to suppress stalling of the internal combustion engine 1 when the transmission 2 is switched from the non-driving shift position (e.g. P range) to the driving shift position (e.g. D range) after cold starting in cold climates.

Figure 2:
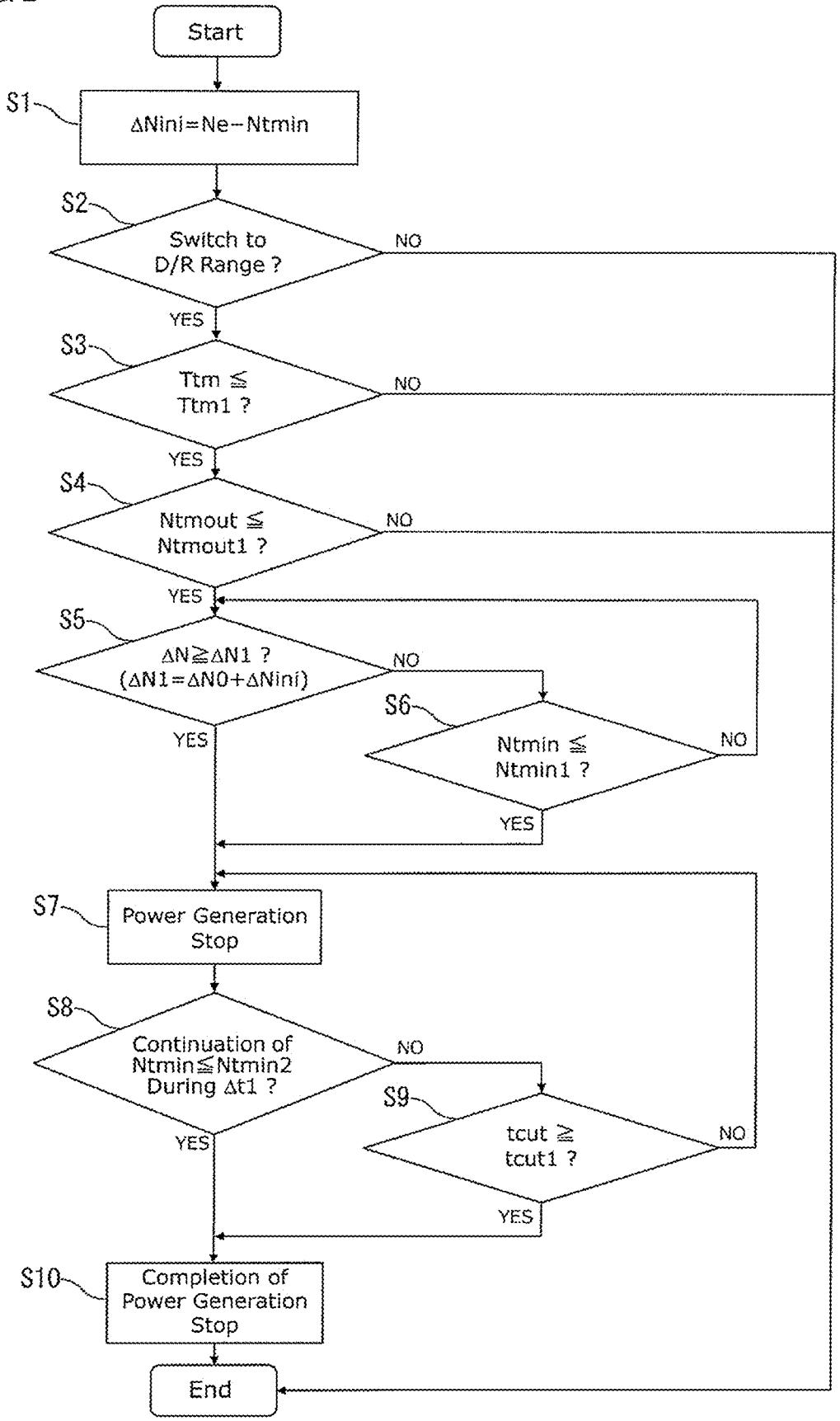
FIG. 2 is a flowchart of the routine processing for electric power generation load reducing control according to one embodiment of the present invention.

FIG. 2 is a flowchart of processing routine for electric power generation load reducing control in the present embodiment. Hereinafter, an explanation will be give of the electric power generation load reducing control. Although the engine controller 12 is configured to repeatedly execute the processing of the flowchart while receiving any required information from the transmission controller 11 in the present embodiment, a part or the whole of the processing may be executed by the transmission controller 11.

In step S1, there is determined a speed difference ΔNini between the engine rotation speed Ne and the transmission input rotation speed Ntmin in the state where the transmission is in the non-driving shift position. In the non-driving shift position such as P range or N range, the clutch 6 is disengaged so that the continuously variable transmission mechanism 5 and the driving wheels 4 are disconnected from the turbine 3b of the torque converter 3. In this state, the input side (pump impeller 3a) and output side (turbine 3b) of the torque converter 3 try to integrally rotate even during a stop of the vehicle. In practice, however, the rotation speed of the output side of the torque converter becomes relatively low due to viscous resistance etc. in accordance with temperature. There thus occur some degree of speed difference ΔNini between the engine rotation speed Ne and the transmission input rotation speed Ntmin. This difference is an initial speed difference before the switching of the shift lever position and is updated sequentially.

In step S2, it is judged whether the transmission has been switched from the non-driving shift position to the driving shift position (D range, R range etc.). The routine exits when the transmission has not been switched from the non-driving shift position to the driving shift position. When the transmission has been switched from the non-driving shift position to the driving shift position, the routine proceeds to step S3.

In step S3, it is judged whether the oil temperature Ttm of the transmission 2 is lower than or equal to a predetermined oil temperature value Ttm1. The routine exits when the transmission oil temperature Ttm is higher than the predetermined oil temperature value Ttm1. The predetermined oil temperature value Ttm1 is set to a relatively low temperature value at which the viscous resistance correlated with the oil temperature has an influence on stalling of the internal combustion engine 1. Accordingly, the stop of the electric power generation is not effected when the transmission oil temperature Ttm is higher than the predetermined oil temperature value Ttm1. In other words, the situation in which the stop of the electric power generation is effected is limited to the minimum necessary range where engine stalling is likely to occur, thereby suppressing battery deterioration.

The routine proceeds to step S4 when the transmission oil temperature Ttm is lower than or equal to the predetermined oil temperature value Ttm1.

In step S4, it is judged whether the transmission output rotation speed Ntmout is lower than or equal to a predetermined rotation speed value Ntmout1. The routine exits when the transmission output rotation speed Ntmout is higher than the predetermined rotation speed value Ntmout1. The predetermined rotation speed value Ntmout1 is set to a rotation speed value at which the vehicle can be considered to be substantially in a stop state. In other words, the stop of the electric power generation is not effected even if the transmission is switched from the non-driving shift position to the driving shift position during running of the vehicle.

The routine proceeds to step S5 when the transmission output rotation speed Ntmout is lower than or equal to the predetermined rotation speed value Ntmout1.

In step S5, it is judged whether the speed difference ΔN between the engine rotation speed Ne and the transmission input rotation speed Ntmin is greater than or equal to a predetermined speed difference value ΔN1. The predetermined speed difference value ΔN1 is set to a value obtained by adding the above-mentioned initial speed difference ΔNini to a certain value ΔN0.

Upon the switching from the non-driving shift position to the driving shift position such as D range, the clutch 6 of the forward/reverse switching mechanism starts being engaged. The clutch 6 shifts from a disengaged state to a fully engaged state via a slip engagement state. On the other hand, the driving wheels 4 are being stopped. The turbine 3b is hence gradually constrained with the progress of engagement of the clutch 6, that is, increase of the torque transmission capacity. As a consequence, the speed difference ΔN between the pump impeller 3a and the turbine 3b increases. Simultaneously, the rotation speed Ne of the internal combustion engine 1 decreases with decrease of the rotation speed of the turbine 3b. In other words, the increase of the speed difference ΔN between the pump impeller 3a and the turbine 3b to the predetermined speed difference value ΔN1 indicates that the load of the transmission 2 side starts acting on the internal combustion engine 1 via the clutch 6, that is, the torque transmission capacity of the clutch 6 reaches a given level.

When the judgment result of step S5 is NO, the routine proceeds to step S6.

In step S6, it is judged whether the transmission input rotation speed Ntmin becomes lower than or equal to a first predetermined rotation speed value Ntmin1. As mentioned above, the turbine 3b is gradually constrained with increase of the torque transmission capacity of the clutch 6. Consequently, the transmission input rotation speed Ntmin decreases. As in the case of the above-mentioned increase of the speed difference ΔN between the pump impeller 3a and the turbine 3b, this decrease of the transmission input rotation speed Ntmin indicates that the load of the transmission 2 side starts acting on the internal combustion engine 1 via the clutch 6. The first predetermined rotation speed value Ntmin1 is set such that the timing at which the transmission input rotation speed Ntmin reaches the predetermined rotation speed value Ntmin1 is the same or similar to the timing at which the speed difference ΔN between the engine rotation speed Ne and the transmission input rotation speed Ntmin becomes greater than or equal to the predetermined speed difference value ΔN1.

When the judgment result of step S5 or step S6 is YES, the routine further proceeds to step S7.

In step S7, the stop of the electric power generation is effected. With this, the electric power generation load of the internal combustion engine 1 is reduced so that the internal combustion engine is suppressed from stalling due to decrease of the engine rotation speed Ne.

After the initiation of the electric power generation stop, it is judged in steps S8 and S9 whether the condition of completion of the electric power generation stop is satisfied or not.

More specifically, it is repeatedly judged in step S8 whether the transmission input rotation speed Ntmin has become lower than or equal to a second predetermined rotation speed value Ntmin2 and the state where the transmission input rotation speed Ntmin is lower than or equal to the second predetermined rotation speed value Ntmin2 has continued for a predetermined time period Δt1. When the judgment result of step S8 is YES, the routine proceeds to step S10.

In step S10, the electric power generation stop is completed (that is, the electric power generation is restarted). In the stop state of the vehicle, the transmission input rotation speed Ntmin finally reaches 0 with full engagement of the clutch 6. In view of a delay in rotation speed decrease etc., however, the rotation speed of the turbine 3b (that is, transmission input rotation speed Ntmin) is herein considered to have sufficiently decreased when the transmission input rotation speed reaches the second predetermined rotation speed value Ntmin before reaching 0. Further, the electric power generation stop is completed after waiting the predetermined time period Δt1 in order to suppress engine stalling caused due to sudden load increase upon the restart of the electric power generation of the alternator 15.

When the judgment result of step S8 is NO, the routine proceeds to step S9.

It is judged in step S9 whether the time tcut lapsed from the initiation of the electric power generation stop becomes longer than or equal to a predetermined time tcut1. When the judgement result of step S9 is YES, the routine proceeds to step S10.

Then, the electric power generation stop is completed in step S10. With this, the battery is prevented from exhaustion or deterioration due to not being used for an excessively long time.

Figure 3:
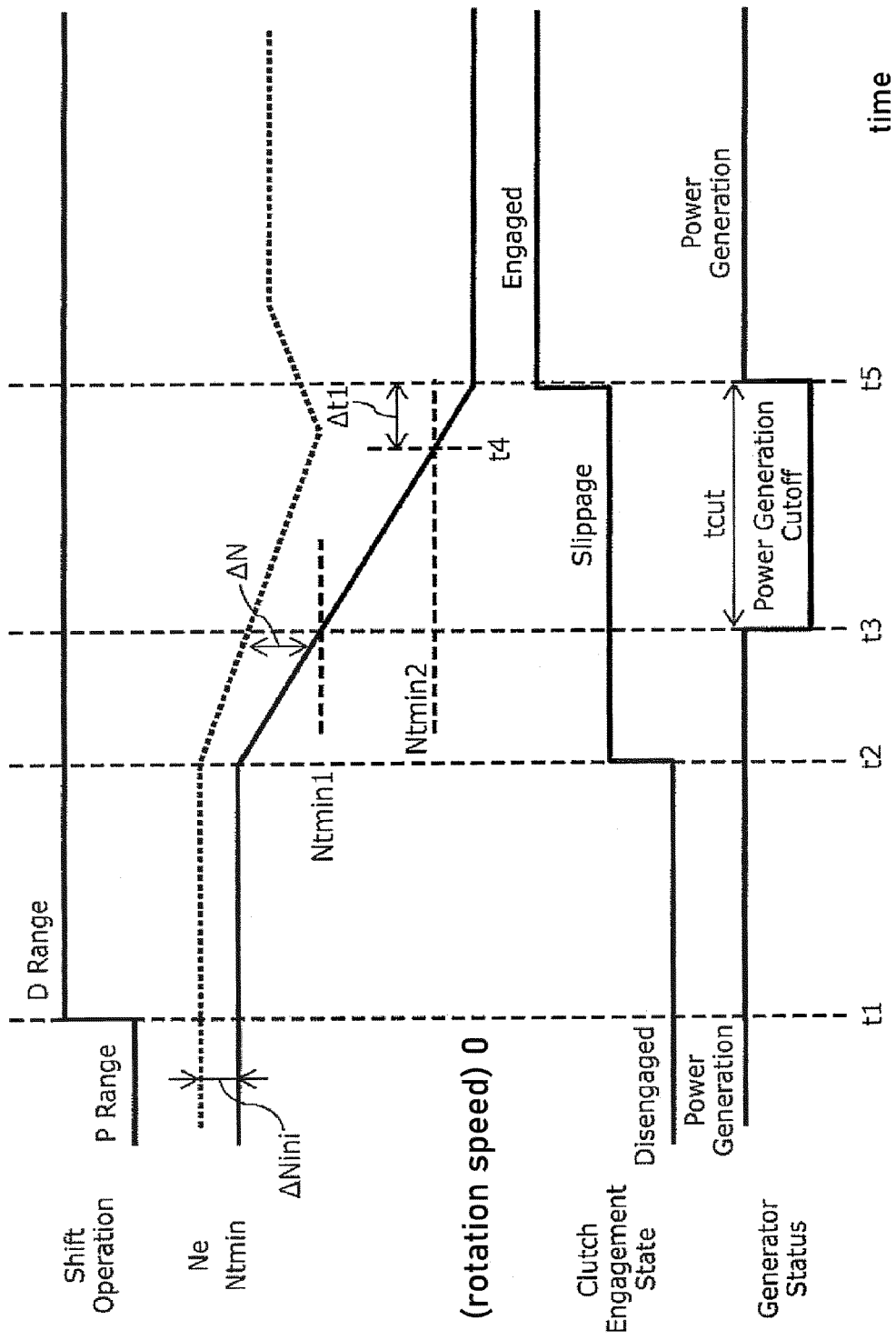
FIG. 3 is a time chart of changes in operation parameters such as engine rotation speed according to one embodiment of the present invention.

FIG. 3 is a time chart of operations under the electric power generation load reducing control in the case where the driver performs switching operation of the shift lever from the P range to the D range. At the starting of the internal combustion engine 1, the shift lever is in the P range; and the clutch 6 is in the disengaged state. Further, the electric power generation of the alternator 15 is started simultaneously with the operation start of the internal combustion engine 1.

Since the clutch 6 is in the disengaged state, the turbine 3b of the torque converter 3 tries to rotate following the pump impeller 3a as mentioned above. However, the turbine 3b becomes relatively low in rotation speed due to viscous resistance etc. There thus occurs the initial speed difference ΔNini between the engine rotation speed Ne and the transmission input rotation speed Ntmin.

In the illustrated example, the shift lever is switched from the P range to the D range at time t1. Because of a delay in operation of the clutch 6 of the transmission 2, the clutch 6 shifts into the slip engagement state at time t2. With such clutch engagement, the torque transmission capacity of the clutch gradually increases. Hence, the transmission input rotation speed Ntmin gradually decreases from time t2 onward. The engine rotation speed Ne decreases with decrease of the transmission input rotation speed Ntmin. Then, the speed difference ΔN between the engine rotation speed Ne and the transmission input speed Ntmin gradually increases.

The stop of the electric power generation of the alternator 15 is effected when the speed difference ΔN becomes greater than or equal to the predetermined speed difference value ΔN1 (at time t3). As mentioned above, the speed difference value ΔN1 is set to a value obtained by adding the initial speed difference ΔNini to the certain value ΔN0. The certain value ΔN0 corresponds to that where the torque transmission capacity of the clutch 6 reaches the given level. It is possible by adding the initial speed difference ΔNini to the certain value ΔN0 to initiate the stop the electric power generation at a more appropriate timing regardless of the magnitude degree of the initial speed difference ΔNini.

The stop of the electric power generation is also effected when the transmission input rotation speed Ntmin becomes lower than or equal to the first predetermined rotation speed value Ntmin1. For example, even in the case where both of the engine rotation speed Ne and the transmission input rotation speed Ntmin decreases without so much increase of the speed difference ΔN, the stop of the electric power generation is effected whereby the electric power generation load is reduced.

After that, the transmission input rotation speed Ntmin becomes lower than or equal to the second predetermined rotation speed value Ntmin2 at time t4. This speed state continues for the predetermined time period Δt1. Then, the stop of the electric power generation is completed (that is, the electric power generation is restarted) at time t5. Furthermore, the electric power generation stop time tcut has been measured from time t3. The stop of the electric power generation is also completed when the electric power generation stop time tcut reaches the predetermined time tcut1.

From time t4 onward, the clutch 6 of the transmission 2 shifts into the fully engaged state via the slip engagement state. In the fully engaged state, the transmission input rotation speed Ntmin becomes 0.

The rotation speed Ne of the internal combustion engine 1 once decreases with decrease of the rotation speed of the turbine 3b, and then, generally changes to increase before the transmission input rotation speed Ntmin becomes 0. At the time when the electric power generation is restarted (time t5), the engine rotation speed Ne is increasing or has reached a finally stable rotation speed level. Thus, it is unlikely that there will occur engine stalling associated with the restart of the electric power generation at time t5.

As described above, the present embodiment effects the stop of the electric power generation for reduction of electric power generation load in accurate recognition of the timing at which the load exerted from the transmission 2 side via the clutch 6 (e.g. the torque exerted to constrain the turbine 3b) actually increases. This enables, while ensuring the minimum period of the electric power generation stop, effective suppression of engine stalling associated with the switching of the shift position.

By the way, in the technique of Patent Document 1, the electric power generation is stopped for a certain time period from the time t1 of switching from the P range to the D range. During e.g. the period from time t1 to time t3, there is no substantial effect from the reduction of power generation load. As a consequence, the stop of the electric power generation is effected for an unnecessarily long time period so that there occurs excessive decrease of the battery SOC or accelerated deterioration of the battery.

Although the present invention has been described by way of the above specific example, the present invention is not limited to the above-described specific embodiment. Various changes and modifications of the above-described specific embodiment are possible.

In the above-described embodiment, it is one condition of the electric power generation stop that the oil temperature Ttm of the transmission 2 is low. Alternatively, the execution of the electric power generation control may be subject to the condition that the altitude is high or the atmospheric pressure is low in place of or in addition to the aforementioned condition. In other words, the electric power generation stop is effected in the situation that the output of the internal combustion engine 1 becomes lower than usual.

Although the electric power generation stop is completed to restart the electric power generation upon satisfaction of the condition of step S8 or S9 in the above-described embodiment, the controller may be configured to judge whether the rotation speed Ne of the internal combustion engine 1 has been sufficiently recovered when the condition of step S8 or S9 is satisfied and then, extend the electric power generation stop when the engine rotation speed is at a level at which there is a fear of engine stalling associated with the restart of the electric power generation.

Further, the controller may be configured to restart the electric power generation in the case where the SOC of the battery is decreased by a certain decrease amount or more after the stop of the electric power generation or in the case where the voltage of the battery becomes lower than a predetermined voltage value.

The controller may be configured to, in the case where the voltage of the battery after cranking of the internal combustion engine 1 is lower than a predefined lower limit value, judge the battery as being deteriorated and prohibit the electric power generation stop at the time of switching of the shift position.

In the flowchart of FIG. 2, only either one of the power generation stop initiation conditions of steps S5 and S6 may be adopted. Similarly, only either one of the power generation stop completion conditions of steps S8 and S9 may be adopted.

For simplicity of control, the predetermined speed difference value ΔN1 as the criterion of judgment in step S5 may be set to a simple constant value without consideration of the initial speed difference ΔNini.

The invention claimed is:

1. An electric power generation load reducing method for an internal combustion engine for a vehicle, the internal combustion engine being connected to a transmission via a torque converter and having a generator driven by an output of the internal combustion engine, the electric power generation load reducing method comprising stopping electric power generation of the generator when a speed difference between a rotation speed of the internal combustion engine and an input rotation speed of the transmission becomes greater than or equal to a predetermined speed difference value after switching of the transmission from a non-driving shift position to a driving shift position, wherein the predetermined speed difference value is set based on an initial speed difference between the rotation speed of the internal combustion engine and the input rotation speed of the transmission at the time of switching from the non-driving shift position to the driving shift position.

2. The electric power generation load reducing method for the internal combustion engine for the vehicle according to claim 1, wherein the predetermined speed difference value is set by adding the initial speed difference to a certain value.

3. The electric power generation load reducing method for the internal combustion engine for the vehicle according to claim 1, further comprising stopping electric power generation of the generator when the input rotation speed of the transmission becomes lower than or equal to a predetermined speed value after switching of the transmission from the non-driving shift position to the driving shift position.

4. The electric power generation load reducing method for the internal combustion engine for the vehicle according to claim 1, wherein the stopping of the electric power generation is effected on a condition that an output rotation speed of the transmission is lower than or equal to a second predetermined value.

5. The electric power generation load reducing method for the internal combustion engine for the vehicle according to claim 1, comprising restarting the electric power generation when the input rotation speed of the transmission becomes lower than or equal to a third predetermined speed value after the stopping of the electric power generation.

6. The electric power generation load reducing method for the internal combustion engine for the vehicle according to claim 1, comprising restarting the electric power generation when a predetermined time period has elapsed from the stopping of the electric power generation.

7. An electric power generation load reducing apparatus for an internal combustion engine for a vehicle, the vehicle comprising: the internal combustion engine having a generator driven by an output of the internal combustion engine; a transmission; a torque converter disposed between the internal combustion engine and the transmission; and a controller that controls the generator, wherein the controller is configured to stop electric power generation of the generator when a speed difference between a rotation speed of the internal combustion engine and an input rotation speed of the transmission becomes greater than or equal to a predetermined speed difference value after switching of the transmission from a non-driving shift position to a driving shift position, and wherein the predetermined speed difference value is set based on an initial speed difference between the rotation speed of the internal combustion engine and the input rotation speed of the transmission at the time of switching from the non-driving shift position to the driving shift position.

8. The electric power generation load reducing apparatus for the internal combustion engine for the vehicle according to claim 7, wherein the predetermined speed difference value is set by adding the initial speed difference to a certain value.

9. The electric power generation load reducing apparatus for the internal combustion engine for the vehicle according to claim 7, wherein the controller is further configured to stop electric power generation of the generator when the input rotation speed of the transmission becomes greater than or equal to a predetermined speed value after switching of the transmission from the non-driving shift position to the driving shift position.

10. An electric power generation load reducing method for an internal combustion engine of a vehicle, the internal combustion engine being connected to a transmission via a torque converter and having a generator driven by an output of the internal combustion engine, the electric power generation load reducing method comprising stopping electric power generation of the generator when a speed difference between a rotation speed of the internal combustion engine and an input rotation speed of the transmission becomes greater than or equal to a predetermined speed difference value after switching of the transmission from a non-driving shift position to a driving shift position, wherein the stopping of the electric power generation is effected when an oil temperature of the transmission is lower than or equal to a predetermined oil temperature value, and is not effected when the oil temperature of the transmission is higher than the predetermined oil temperature value.

* * * * *